(12) United States Patent
Vuille

(10) Patent No.: US 11,003,140 B2
(45) Date of Patent: May 11, 2021

(54) BENCH FOR DISASSEMBLING A WATCH WITH SECURED FASTENING

(71) Applicant: The Swatch Group Research and Development Ltd, Marin (CH)

(72) Inventor: Pierry Vuille, Les Emibois (CH)

(73) Assignee: The Swatch Group Research and Development Ltd, Marin (CH)

( * ) Notice: Subject to any disclaimer, the term of this patent is extended or adjusted under 35 U.S.C. 154(b) by 610 days.

(21) Appl. No.: 15/729,726

(22) Filed: Oct. 11, 2017

(65) Prior Publication Data

US 2018/0113424 A1 Apr. 26, 2018

(30) Foreign Application Priority Data

Oct. 26, 2016 (EP) .................................... 16195648

(51) Int. Cl.
  *G04D 1/00* (2006.01)
  *B23P 19/04* (2006.01)
  *G04D 1/10* (2006.01)

(52) U.S. Cl.
  CPC ............ *G04D 1/0014* (2013.01); *B23P 19/04* (2013.01); *G04D 1/10* (2013.01)

(58) Field of Classification Search
  CPC .......... G04D 1/0014; G04D 1/10; G04D 1/00; G04D 3/00; B23P 19/04; B23B 31/16; B23Q 1/0081; B23Q 1/009; Y10T 279/19; Y10T 279/23; Y10T 279/24; Y10T 307/779; Y10T 403/1633; E05B 19/04;

(Continued)

(56) References Cited

U.S. PATENT DOCUMENTS 3,145,459 A   8/1964 Shiffman
3,589,486 A * 6/1971 Kelch ................... F16D 41/18
                                                192/46

(Continued)

FOREIGN PATENT DOCUMENTS

CH         271169       10/1950
CH     000512772 A  *  1/1970

OTHER PUBLICATIONS

European Search Report dated May 29, 2017 in European Application 16195648.7, filed on Oct. 26, 2016 (with English Translation of Categories of cited documents).

(Continued)

*Primary Examiner* — Lee D Wilson
*Assistant Examiner* — Mahdi H Nejad
(74) *Attorney, Agent, or Firm* — Oblon, McClelland, Maier & Neustadt, L.L.P.

(57) ABSTRACT

A disassembly bench is for unlocking and disassembling a first component and a second component of a watch with secured fastening including handling devices to transmit a relative disassembly movement between this first component and this second component. The bench also includes centrifuging devices and/or pneumatic or hydraulic devices for simultaneous application of a centrifugal force and/or an overpressure or an underpressure to such a watch to press into a position of free passage one or more slides arranged to immobilize this first component and this second component in a locked position. A watchmaking set includes such a disassembly bench and such a watch with secured fastening.

15 Claims, 3 Drawing Sheets

(58) Field of Classification Search
CPC ........ E05B 19/20; E05B 73/00; E05B 65/006; G07C 9/00944; B60B 7/16; B60K 15/0409; G04B 37/00
USPC .......... 269/309, 48.1; 70/413, 276, 166–169
See application file for complete search history.

(56) References Cited

U.S. PATENT DOCUMENTS

| | | | | |
|---|---|---|---|---|
| 3,941,327 | A * | 3/1976 | McCollum | G11B 15/662 242/574.4 |
| 7,484,605 | B2 * | 2/2009 | Pawley | F16D 41/16 192/43.1 |
| 8,337,077 | B2 * | 12/2012 | Giacobino | F16D 41/18 368/206 |
| 2005/0270908 | A1 * | 12/2005 | Gueissaz | G04D 7/007 368/11 |
| 2007/0131509 | A1 * | 6/2007 | Kimes | F16D 41/12 192/46 |
| 2008/0018060 | A1 * | 1/2008 | Ishii | B23B 31/16245 279/4.06 |
| 2011/0187130 | A1 * | 8/2011 | Wittke | E05B 47/0047 292/138 |
| 2011/0290608 | A1 * | 12/2011 | Bird | F16D 41/12 192/45.1 |
| 2012/0186054 | A1 * | 7/2012 | Cusin | G04B 11/028 29/225 |
| 2016/0124389 | A1 * | 5/2016 | Lechot | G04B 31/02 368/322 |
| 2018/0087334 | A1 * | 3/2018 | Bouligny | F16H 1/225 |

OTHER PUBLICATIONS

"Waterproof Watches New Case Opener for", Horological Journal, vol. 112, XP001444135, 1970, 2 pages.

* cited by examiner

BENCH FOR DISASSEMBLING A WATCH WITH SECURED FASTENING

This application claims priority from European Patent Application No. 16195648.7 filed on Oct. 26, 2016; the entire disclosure of which is incorporated herein by reference.

FIELD OF THE INVENTION

The invention relates to a disassembly bench for unlocking and disassembling a first component and a second component of a watch with secured fastening comprising at least two slides for immobilising said first component and said second component in a locked position.

The invention also relates to a watchmaking set comprising such a disassembly bench and such a watch with secured fastening.

The invention relates to the field of high-quality watches such as dive watches or watches with complications, which must not be opened by unskilled hands so as to avoid any pollution, any break of seal or also any degradation or loss of adjustment. The invention relates more particularly to the external parts of such watches and the links between the case and base, and similar.

BACKGROUND OF THE INVENTION

Dive watches or watches with complications must not be capable of being opened by any person because of the particular constraints of tightness, cleanliness, lubrication or also adjustment. Some watches have to be returned to the factory for internal repairs in order to guarantee to the user that all their function characteristics are maintained and their aesthetic appearance is faultless. It is therefore advantageous in the factory or in licensed after-sales service to have devices available that enable watches with secured fastening to be opened that are designed to be unopenable for watchmakers who do not have the appropriate set of tools, and hence for any user.

The design of an unopenable watch in the absence of a particular tool must not overly complicate the production of this watch, its assembly operations must remain as conventional as possible.

SUMMARY OF THE INVENTION

The invention proposes to make available to the watch manufacturer a set of tools, which enables him to disassemble watches with secured fastening designed specially to prevent any inopportune disassembly. The invention also proposes watch arrangements designed for this purpose.

For this, the invention relates to a disassembly bench for unlocking and disassembling a first component and a second component of a watch with secured fastening.

The invention also relates to a watchmaking set comprising such a disassembly bench and such a watch with secured fastening.

BRIEF DESCRIPTION OF THE DRAWINGS

Other characteristics and advantages of the invention will become clearer on reading the following detailed description with reference to the attached drawings, wherein.

DETAILED DESCRIPTION OF PREFERRED EMBODIMENTS

Figure 1:
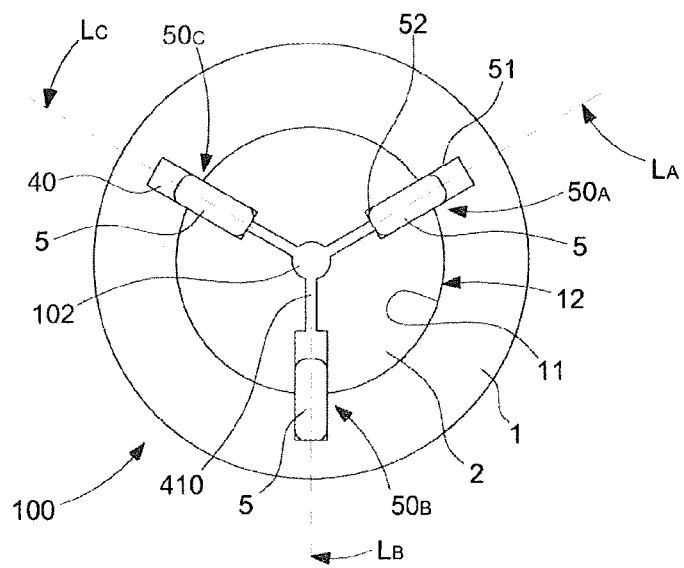
FIG. 1 is a schematic plan view of a first external component and a second internal component of a watch that are fitted together, each having slots which in the indexed assembly position are aligned to delimit chambers, in which slides are movable. In this figure the slides are completely free, each in its chamber, and only subjected to gravity, and the watch is shown locked in a vertical position where the lowest slide in the figure rests on the external component, whereas the two others rest on the internal component; and the ends of the chambers on the side of this internal component are connected by channels to a central inlet for the insertion or extraction of a fluid.
Figure 2:
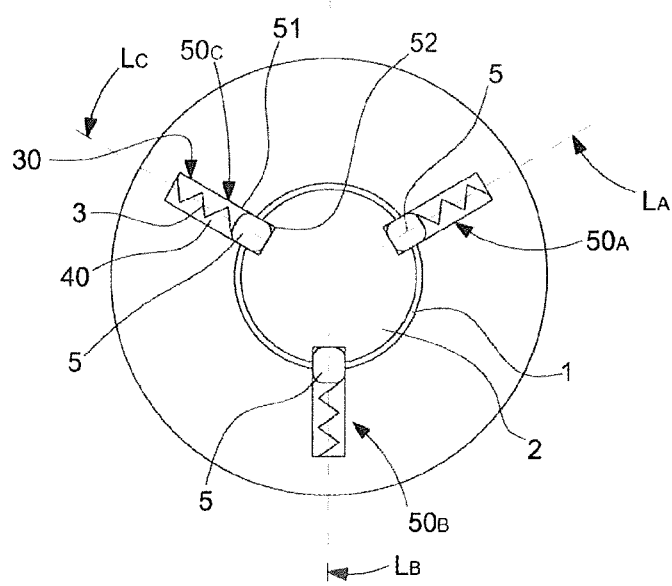
FIG. 2 in a similar manner to FIG. 1 shows another watch where each chamber encloses a slide, formed here by a ball, pushed out of the external component by a spring. In this variant the chambers do not connect to the outside and only the centrifugal force can modify the position of all the balls, in contrast to a shock that can modify the position of only part of the balls. This figure illustrates the locked position where each ball prevents any relative rotation between the internal component and the external component.

The invention is described in a non-restrictive manner with respect to the securing of the middle part-base connection of a watch. It is, of course, applicable to other components of a watch subject to having the space necessary for securing elements, which will hereafter be called slides.

The invention relates to a disassembly bench 500 for unlocking and disassembling a first component 1 and a second component 2 of a watch 100 with secured fastening.

According to the invention this disassembly bench 500 comprises handling devices 530 arranged to transmit a relative disassembly movement between the first component 1 and the second component 2.

This bench 500 also comprises centrifuging devices 510 and/or pneumatic or hydraulic devices 520 for simultaneous application of a centrifugal force and/or an overpressure or an underpressure to such a watch 100 to press one or more slides 5 into a position of free passage. Each of these slides has firstly been arranged in this watch 100 to immobilise the first component 1 and the second component 2 in a locked position: the slide 5 is movable between its locking position and its position of free passage, and only the bench 500 according to the invention enables it to leave its locking position to return to its position of free passage. It is understood that the action of the handling devices 530 is only possible when all the slides 5 are in the position of free passage. In a particular variant this position of free passage is an unstable position, this is the case in particular when the slide 5 is subjected to the action of elastic restoring means 30, in particular a spring.

It is understood that the action of the handling devices 530 occurs during application of the particular devices of the bench 500, in particular during centrifugation, and that these handling devices 530 are ineffective if not all the slides 5 are freed.

Naturally, if this bench 500 is designated as disassembly bench, it is because of its ability to overcome the secured locking. However, it is noted that some of its functionalities also enable it to perform certain assembly functions, if desired, for example, at the initial assembly stage to house some components such as slides in cavities that are inaccessible by other devices.

The bench 500 can be simplified according to the type of watch to be disassembled and does not necessarily comprise all the mentioned devices: handling devices, centrifuging devices, pneumatic or hydraulic devices.

The invention also relates to a watchmaking set 1000 comprising such a disassembly bench 500 and at least one watch 100 with secured fastening.

This watch 100 with secured fastening has a first component 1 and a second component 2, which are arranged to be fitted together in a complementary manner respectively through a first surface 11 and a second surface 12, and to be indexed in assembly position by at least one pair 50 comprising first indexing means 51 at the level of the first component 1 and second indexing means 52 at the level of the second component 2. These first indexing devices 51 and second indexing devices 52 are complementary to one another or, as in the non-restrictive illustrated embodiments, to such a slide within each said pair 50.

The figures illustrate three pairs 50A, 50B, 50C, for each of the watches illustrated.

The first indexing devices 51 and second indexing devices 52 of each pair 50 are aligned two by two in the assembly position to define a chamber 40, in which a slide 5 is movable between a position of free passage and a locking position, in which this slide 5 is arranged to lock the first component 1 and the second component 2 in an assembled and locked position.

According to the invention in this assembled and locked position of the first component 1 and second component 2 and in at least one such pair 50, the first indexing devices 51 and the second indexing devices 52 and said slide 5 are inaccessible to any tool.

Moreover, the centrifuging devices 510 and/or pneumatic or hydraulic devices 520 of the bench 500 are arranged for simultaneous application of a centrifugal force and/or an overpressure or an underpressure to each chamber 40. Only this simultaneous application allows the simultaneous movement of the slides 5, which alone permits the relative displacement of the first component 1 and second component 2.

Moreover, only the simultaneous application to each pair 50 belonging to the watch 100 of a centrifugal force by these centrifuging devices 510 and/or of a pressure variation by these pneumatic or hydraulic devices 520 actuates a release movement of each slide 5 in each pair 50 belonging to the watch 100 to allow the unlocking of the first component 1 and second component 2 and to permit a relative movement between the first component 1 and the second component 2 under the action of the handling devices 530, which comprise, for example, means for holding one of the components and means for screwing or unscrewing the other component.

More particularly, the watch 100 comprises a plurality of such chambers 40, in each of which the slide 5 is movable in a curvilinear or linear direction L, in which this chamber 40 extends.

At least two of these chambers 40 preferably have non-parallel directions L.

More particularly, the directions L are linear, as in the variants of the figures. However, nothing prevents curvilinear directions, in particular in the case of hairpin-shaped chambers, in which a slide 5 such as a ball can pass from one branch to the other in complex manoeuvrings requiring computerised means for navigating the different devices belonging to the bench 500.

More particularly, and as evident in FIGS. 2 to 7, at least one slide 5 is held in its position of locking the first component 1 and the second component 2 by elastic restoring means 30, and the disassembly bench 500 is arranged to apply a centrifugal force and/or a pressure variation to this slide 5 and apply a sufficient force thereto to overcome the restoring force of these elastic restoring means 30 and to ensure the displacement of the slide 5 in its chamber 40 towards its position of free passage to ensure unlocking.

More particularly, in a variant at least one said slide 5 is held in its position of locking the first component 1 and the second component 2 by magnetic attraction or repulsion means 60.

Moreover, the disassembly bench 500 then comprises magnetic means 540, which during the application of a centrifugal force or a pressure variation for the unlocking are arranged to apply to one or more slides 5 a magnetic field against these magnetic attraction or repulsion means 60 belonging to a watch 100 to repel or attract the slides 5.

More particularly, the first indexing means 51 and/or second indexing means 52 are non-magnetic.

More particularly, the first indexing means 51 and/or second indexing means 52 are electrostatic conductors.

More particularly, the first surface 11 and second surface 12 are contact surfaces arranged to cooperate with one another in a bayonet type assembly.

Figure 8:
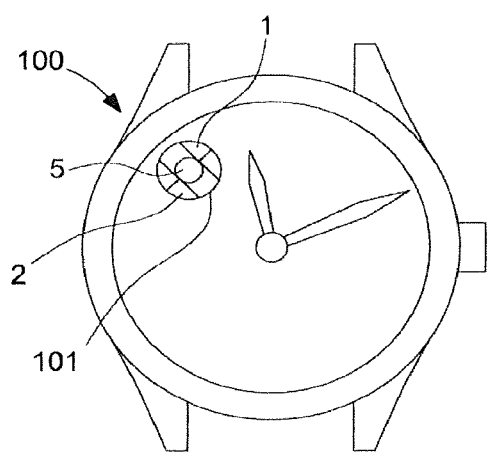
FIG. 8 is a schematic plan view of a watch according to one of these variants comprising an aperture, through which the user can see the slide if this is in the locking position.
Figure 9:
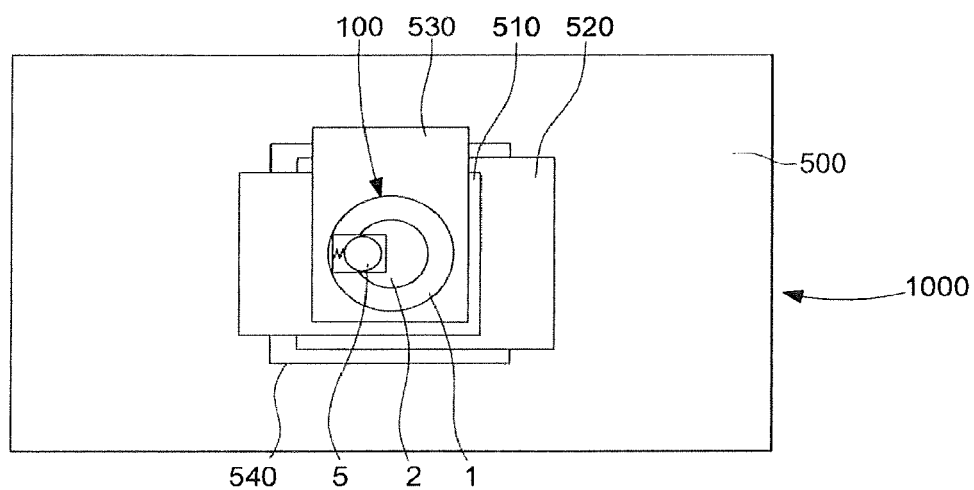
FIG. 9 is a schematic view of an assembly comprising, on the one hand, a disassembly bench that comprises handling devices, centrifuging devices and pneumatic or hydraulic devices and, on the other hand, comprises a watch with secured fastening subjected to the action of all or some of these different devices.

More particularly, as evident in FIG. 8, the watch 100 comprises at least one aperture 101 arranged to display the position of a slide 5 in the assembled and locked position of the first component 1 and second component 2. More particularly, the watch 100 comprises at least one aperture 101 arranged to display the position of each slide 5 in this assembled and locked position.

Figure 6:
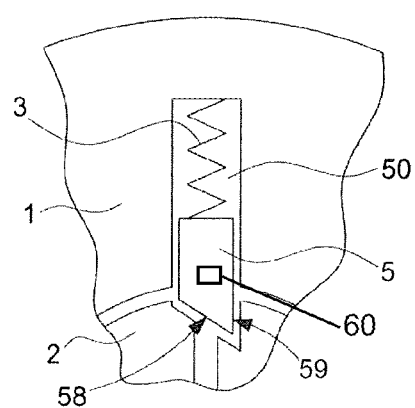
FIG. 6 in a similar manner to FIG. 1 shows a detail of a further watch where the slide has no degree of freedom of rotation and, in a similar manner to the slide of a usual door lock, permits a relative rotation between the two components in one direction and opposes this in the other.
Figure 3:
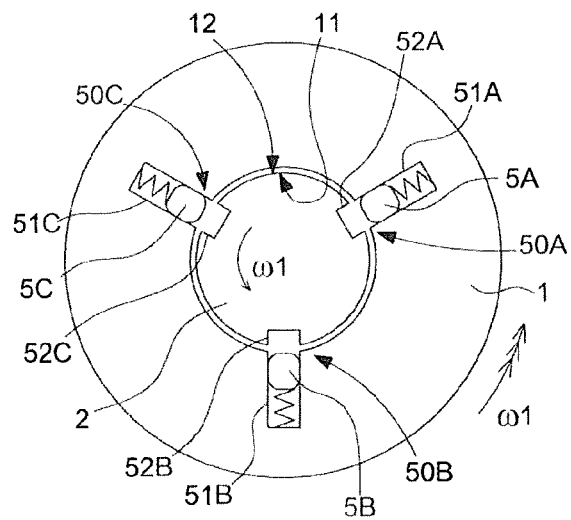
FIG. 3 shows the mechanism of FIG. 2 during a synchronous rotation of the internal component and the external component, during which the balls move away from the centre under the effect of the centrifugal force and permit a relative rotation between the two components.
Figure 4:
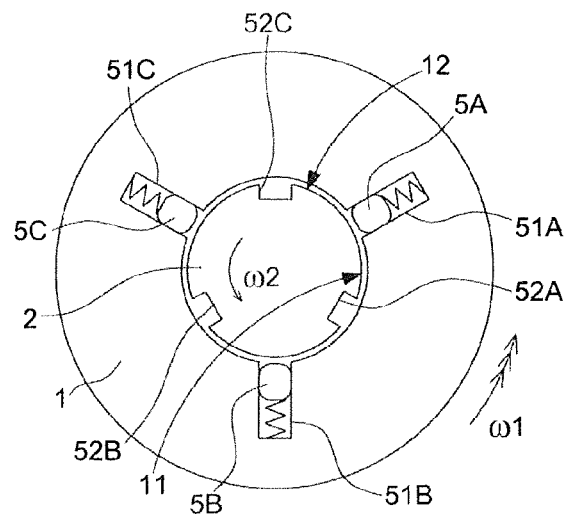
FIG. 4 shows the mechanism of FIG. 2 during a differential rotation after the step of synchronous rotation of FIG. 3, wherein this differential rotation permits a relative rotation between the two components and their disassembly.
Figure 5:
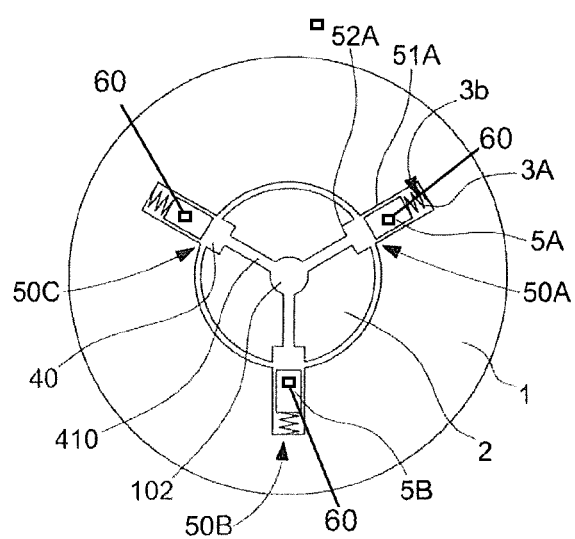
FIG. 5 in a similar manner to FIG. 1 shows a further watch where each chamber encloses a slide pushed out of the external component by a spring. The ends of the chambers on the side of the internal component are connected by channels to a central inlet for the insertion or extraction of a fluid.
Figure 7:
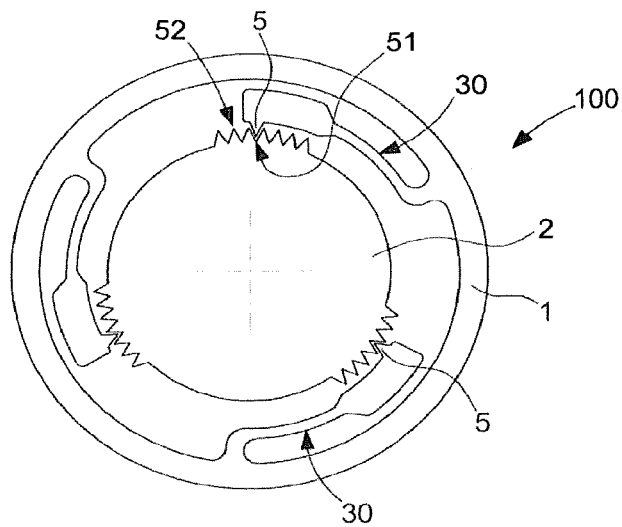
FIG. 7 in a similar manner to FIG. 1 shows a further watch comprising three elastic slides at 120° to one another, each comprising a support inertia block of a tooth and connected by an elastic arm to the first external component, an inside surface of which forms a centrifuging stop face, and the second internal component has series of notches arranged to receive the teeth of the slides.

In a variant illustrated in FIG. 6 the first component 1 and second component 2 are arranged to be screwed to one another during their assembly, and at least one slide is freely movable only in translation in its chamber 40 and on a first side has an oblique or curved slope 58 arranged to allow the slide 5 to be slid over during screwing, and on a second side has a steep edge 59 arranged to prevent passage of the slide 5 during the unscrewing when the slide 5 cooperates simultaneously with the first indexing means 51 and the second indexing means 52.

In a particular variant the watch 100 comprises an inlet 102 for insertion or extraction of a fluid through a channel 410 in or outside each chamber 40 belonging to the watch 100.

In a particular variant (not shown) the watch 100 comprises at least one helium release valve for evacuation of the fluid in the case of an overpressure above a safe value.

In a structural variant the first indexing means 51 or the second indexing means 52, which form a part of a chamber 40, are extended by a channel arranged for the initial insertion of the slide 5 during manufacture of the watch 100, in particular under the action of the application of a centrifugal force or a pressure variation via the disassembly bench 500, and this channel is then sealed by a Lee Plug or similar, as used in high-pressure flight hydraulics to lock in the slide 5 and guarantee tightness at great depth.

Naturally, these different structural variants are compatible with the usual arrangement of gaskets, more particularly for dive watches. They are also compatible with the use of elastic elements, in particular shape memory elements, to ensure an increasing clamping during assembly of the first element with the second.

What is claimed is:

1. A disassembly bench for unlocking and disassembling a first component and a second component of a watch with secured fastening comprising at least two slides for immobilising said first component and said second component in a locked position, wherein said disassembly bench comprises:
    handling devices arranged to transmit a relative disassembly movement between said first component and said second component; and
    centrifuging devices for simultaneous application of a centrifugal force to all said slides and pneumatic or hydraulic devices to apply an overpressure or an underpressure to the watch to press all said slides into a position of free passage,
    wherein an action of said handling devices is only possible when all said slides are in said position of free passage, and
    wherein said disassembly bench further comprises magnetic means arranged to apply to one or more of said slides a magnetic field against magnetic attraction or repulsion means belonging to said watch to repel or attract said one or more of said slides.

2. A watchmaking set comprising:
    a disassembly bench for unlocking and disassembling a first component and a second component of a watch with secured fastening comprising at least two slides for immobilising said first component and said second component in a locked position, wherein said disassembly bench comprises:
        handling devices arranged to transmit a relative disassembly movement between said first component and said second component, and
        centrifuging devices for simultaneous application of a centrifugal force to all said slides and pneumatic or hydraulic devices to apply an overpressure or an underpressure to the watch to press all said slides into a position of free passage, wherein an action of said handling devices is only possible when all said slides are in said position of free passage; and
    said watch with secured fastening, which has said first component and said second component, which are arranged to be fitted together in a complementary manner respectively through a first surface and a second surface, and indexed in assembly position by at least two pairs comprising first indexing means of said first component and second indexing means of said second component that are complementary to one another or to such a respective slide of said at least two slides within each respective pair of said at least two pairs, and said first indexing means and second indexing means of each respective pair of said at least two pairs are aligned two by two in said assembly position to define a chamber, in which a each respective slide of said at least two slides is movable between said position of free passage and a locked position, in which said slide is arranged to lock said first component and said second component,
    wherein, in said locked position of said first component and said second component, in at least one of said at least two pairs, said first indexing means, the second indexing means, and a respective slide of the at least two slides are inaccessible to any tool,
    wherein said centrifuging devices and said pneumatic or hydraulic devices are arranged for simultaneous application of said centrifugal force and/or said overpressure and said underpressure to each said chamber, and
    wherein only the simultaneous application to each said pair of the at least two pairs belonging to said watch of a centrifugal force by said centrifuging devices or a pressure variation by said pneumatic or hydraulic devices actuates a release movement of each said slide of the at least two slides in each said pair of the at least two pairs belonging to said watch to allow the unlocking of said first component and said second component and to permit a relative movement between said first component and said second component under the action of said handling devices.

3. The watchmaking set according to claim 2, wherein said watch comprises a plurality of said chambers, and, in each chamber of said plurality of chambers, a respective slide of the at least two slides is movable in a curvilinear or linear direction in which said chamber extends.

4. The watchmaking set according to claim 3, wherein at least two chambers of said plurality of chambers extend in non-parallel directions.

5. The watchmaking set according to claim 2, wherein at least one slide of the at least two slides is held in the locked position by elastic restoring means, and wherein said disassembly bench is arranged to apply said centrifugal force or said pressure variation to said one slide of the at least two slides and apply a sufficient force thereto to overcome a restoring force of said elastic restoring means and to ensure the displacement of said one slide of the at least two slides in its chamber for said unlocking.

6. The watchmaking set according to claim 5, wherein said elastic restoring means is a spring.

7. The watchmaking set according to claim 2, wherein at least one slide of the at least two slides is held in the locked position by magnetic attraction or repulsion means, and wherein said disassembly bench comprises magnetic means and is arranged to apply to said one slide of the at least two slides during said application of said centrifugal force and said pressure variation by said disassembly bench for the unlocking, the application of a magnetic field by these magnetic means against said magnetic attraction or repulsion means.

8. The watchmaking set according to claim 2, wherein said first indexing means and/or second indexing means are non-magnetic.

9. The watchmaking set according to claim 2, wherein said first indexing means and/or second indexing means are electrostatic conductors.

10. The watchmaking set according to claim 2, wherein said first surface and second surface are contact surfaces arranged to cooperate with one another in a bayonet type assembly.

11. The watchmaking set according to claim 2, wherein said watch comprises at least one aperture arranged to display a position of a slide of said at least two slides in said locked position of said first component and said second component.

12. The watchmaking set according to claim 11, wherein said watch comprises at least one aperture arranged to display a position of each slide of the at least two slides in said locked position of said first component and said second component.

13. The watchmaking set according to claim 2, wherein said first component and said second component are arranged to be screwed to one another during their assembly, and wherein at least one slide of said at least two slides is freely movable only in translation in its said chamber and on a first side has an oblique or curved slope arranged to allow said one slide of said at least two slides to be slid over during screwing, and on a second side has a steep edge arranged to prevent passage of said one slide of said at least two slides during unscrewing when said one slide of said at least two slides cooperates simultaneously with said first indexing means and said second indexing means.

14. The watchmaking set according to claim 2, wherein said watch comprises an inlet for insertion or extraction of a fluid through a channel in or outside each said chamber belonging to said watch.

15. The watchmaking set according to claim 14, wherein said watch comprises at least one helium release valve for evacuation of said fluid in case of an overpressure above a safe value.

* * * * *

UNITED STATES PATENT AND TRADEMARK OFFICE
CERTIFICATE OF CORRECTION

PATENT NO.        : 11,003,140 B2                                   Page 1 of 1
APPLICATION NO.   : 15/729726
DATED             : May 11, 2021
INVENTOR(S)       : Pierry Vuille It is certified that error appears in the above-identified patent and that said Letters Patent is hereby corrected as shown below:

In the Claims

In Column 6, Claim 2, Line 17, delete "a".

In Column 6, Claim 2, Line 29, delete "and/or" and insert -- and --, therefor.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*